(12) United States Patent
Kramer

(10) Patent No.: US 6,250,429 B1
(45) Date of Patent: Jun. 26, 2001

(54) BRAKE SHOE ASSEMBLY HAVING A RESISTIVE BRAKE LINING WEAR SENSOR

(75) Inventor: Dennis A. Kramer, Troy, MI (US)

(73) Assignee: Meritor Heavy Vehicle Systems LLC, Troy, MI (US)

( * ) Notice: Subject to any disclaimer, the term of this patent is extended or adjusted under 35 U.S.C. 154(b) by 0 days.

(21) Appl. No.: 09/169,527

(22) Filed: Oct. 9, 1998

(51) Int. Cl.⁷ .................................................. F16D 66/00

(52) U.S. Cl. ..................... 188/1.11 L; 340/454; 73/121

(58) Field of Search ................ 188/1.11 L, 1.11 W, 188/1.11 E, 1.11 R, 79.52; 340/453, 454; 116/208; 73/121, 129

(56) References Cited

U.S. PATENT DOCUMENTS

| | | | |
|---|---|---|---|
| 1,957,051 | 5/1934 | Norton | 73/32 |
| 2,117,027 | 5/1938 | Langbein | 73/341 |
| 2,494,269 | 1/1950 | Sparkes | 177/311 |
| 3,088,549 | 5/1963 | Borsa | 188/1 |
| 3,314,618 | 4/1967 | McDonald | 241/299 |
| 3,321,045 | 5/1967 | Veilleux | 188/1 |
| 3,398,246 | 8/1968 | Linet | 200/61.4 |
| 3,556,258 | 1/1971 | Winge et al. | 188/1 |
| 3,674,114 | 7/1972 | Howard | 188/1 A |
| 3,689,880 | 9/1972 | McKee et al. | 340/52 A |
| 3,800,278 | 3/1974 | Jaye et al. | 340/52 A |
| 3,805,228 | 4/1974 | Peeples | 340/52 A |
| 3,825,891 | 7/1974 | Kinast | 340/52 A |
| 3,914,734 | 10/1975 | Rigalt | 340/52 A |
| 3,958,445 | 5/1976 | Howard et al. | 73/7 |
| 3,975,706 | 8/1976 | Kato | 340/52 A |
| 4,016,533 | 4/1977 | Ishikawa et al. | 340/52 A |
| 4,020,454 | 4/1977 | Malonee | 340/52 B |
| 4,188,613 | 2/1980 | Yang et al. | 340/52 A |
| 4,204,190 | 5/1980 | Wiley et al. | 340/52 A |
| 4,241,603 | 12/1980 | Han et al. | 73/129 |
| 4,298,857 | 11/1981 | Robins et al. | 340/52 A |
| 4,387,789 | 6/1983 | Borugian | 188/1.11 |
| 4,508,196 | 4/1985 | Jamon | 188/1.11 |
| 4,520,661 | 6/1985 | Tamai et al. | 73/129 |
| 4,562,421 | 12/1985 | Duffy | 340/52 A |
| 4,604,604 | 8/1986 | Mann | 340/52 A |
| 4,606,435 | 8/1986 | Johnson | 188/1.11 |
| 4,641,519 | 2/1987 | Klein et al. | 73/129 |
| 4,646,001 | 2/1987 | Baldwin et al. | 324/65 P |
| 4,649,370 | 3/1987 | Thomason | 340/52 B |
| 4,658,936 | 4/1987 | Moseley | 188/1.11 |
| 4,674,326 | 6/1987 | Reinecke | 73/129 |
| 4,790,606 | 12/1988 | Reinecke | 303/103 |
| 4,824,260 | 4/1989 | Novotny et al. | 374/179 |
| 4,869,350 | 9/1989 | Fargier et al. | 188/1.11 |
| 4,964,679 | 10/1990 | Rath | 303/100 |

(List continued on next page.)

FOREIGN PATENT DOCUMENTS

| | | |
|---|---|---|
| 3905190 | 5/1990 | (DE) . |
| 3915996 | 6/1990 | (DE) . |
| 2574508 | 12/1984 | (FR) . |
| 57-14402 | 7/1982 | (JP) . |

Primary Examiner—Matthew C. Graham
Assistant Examiner—Pamela J. Lipka
(74) Attorney, Agent, or Firm—Carlson Gaskey & Olds, P.C.

(57) ABSTRACT

A brake shoe assembly includes a brake lining and a brake lining wear sensor. The brake lining has a predetermined thickness which gradually wears away as the brake shoe assembly is used to brake a vehicle. The brake lining wear sensor has a pair of spaced electrical conductors and an electrical resistance located across the pair of spaced conductors for indicating the thickness of the brake lining. The brake lining wear sensor is positioned to wear away concurrently with the brake lining, thereby continuously changing the electrical resistance across the pair of spaced conductors. In this manner, the electrical resistance across the pair of spaced conductors is used to determine the thickness of the brake lining. The brake lining wear sensor can be assembled in alternative embodiments as disclosed.

18 Claims, 2 Drawing Sheets

U.S. PATENT DOCUMENTS

| | | | |
|---|---|---|---|
| 4,971,179 | 11/1990 | Gebhardt et al. | 188/33 |
| 5,079,947 | 1/1992 | Feldmann et al. | 73/129 |
| 5,151,681 | 9/1992 | Valmir et al. | 340/454 |
| 5,168,260 | 12/1992 | Mery | 340/454 |
| 5,189,391 | 2/1993 | Feldmann et al. | 340/453 |
| 5,302,940 | 4/1994 | Chen | 340/454 |
| 5,307,673 | 5/1994 | Ito et al. | 73/129 |
| 5,372,221 | 12/1994 | Jalbert | 188/1.11 |
| 5,417,312 * | 5/1995 | Tsuchitani et al. | 188/181 A |
| 5,419,415 | 5/1995 | Lamb et al. | 188/1.11 |
| 5,550,743 | 8/1996 | Kyrtsos | 364/449 |
| 5,559,286 | 9/1996 | White et al. | 73/129 |
| 5,637,794 | 6/1997 | Hanisko | 73/121 |
| 5,651,431 | 7/1997 | Kyrtsos | 188/1.11 L |
| 5,668,529 | 9/1997 | Kyrtsos | 340/454 |

* cited by examiner

BRAKE SHOE ASSEMBLY HAVING A RESISTIVE BRAKE LINING WEAR SENSOR

BACKGROUND OF THE INVENTION

This application relates to a brake shoe assembly having a resistive brake lining wear sensor.

Most motor vehicles include a brake system having a set of brake shoe assemblies for retarding the rotation of the wheels of the vehicle when the brakes are applied. Typically, each brake shoe assembly includes a brake lining made of a friction material which gradually wears away during brake applications. After numerous brake applications, the brake lining wears below a critical material thickness and, therefore, must be replaced. As a result, the brake lining must be periodically inspected for excessive wear. To eliminate time-consuming and costly visual inspections of the brake lining, the prior ar t has taught several types of brake lining wear sensors for indicating when the brake lining must be replaced.

One type of brake lining wear sensor, sometimes referred to as a direct read sensor, directly monitors the material thickness of the brake lining. Although direct read sensors provide the most accurate indication of when replacement of the brake lining is necessary, prior art direct read sensors are expensive, complex, and prone to failure. Accordingly, it would be desirable to provide an inexpensive, simple, and robust direct read brake lining wear sensor.

SUMMARY OF THE INVENTION

In a disclosed embodiment of this invention, a brake shoe assembly includes a brake lining and a brake lining wear sensor. The brake lining has a predetermined thickness which gradually wears away as the brake shoe assembly is used to brake a vehicle. The brake lining wear sensor has a pair of spaced electrical conductors and an electrical resistance located across the pair of spaced conductors for indicating the thickness of the brake lining. The brake lining wear sensor is positioned to wear away concurrently with the brake lining, thereby continuously changing the electrical resistance across the pair of spaced conductors. In this manner, the electrical resistance across the pair of spaced conductors is used to determine the thickness of the brake lining.

In a first embodiment of this invention, the brake lining wear sensor includes an insulating substrate, the pair of spaced electrical conductors cohered to one surface of the substrate, and a layer of material cohered to the substrate. In this first embodiment, the layer of material provides the electrical resistance across the pair of spaced conductors.

In a second embodiment of this invention, the brake lining wear sensor includes an insulating substrate, the pair of spaced electrical conductors cohered to one surface of the substrate, and a body of material supporting the substrate. In this second embodiment, the body of material provides the electrical resistance across the pair of spaced conductors.

In a third embodiment of this invention, the brake lining wear sensor includes a substrate and the pair of spaced electrical conductors cohered to one surface of the substrate. In this third embodiment, a resistive compound is mixed in the substrate to provide an electrical resistance across the pair of spaced conductors.

In a fourth embodiment of this invention, the brake lining wear sensor includes a frame and a body of material supporting the frame. The frame includes the pair of spaced electrical conductors and a plurality of support pieces attached between the pair of spaced conductors. In this fourth embodiment, the body of material provides an electrical resistance across the pair of spaced conductors.

These and other features of the present invention will be best understood from the following specification and drawings, the following of which is a brief description.

DETAILED DESCRIPTION OF THE PREFERRED EMBODIMENT

Figure 1:
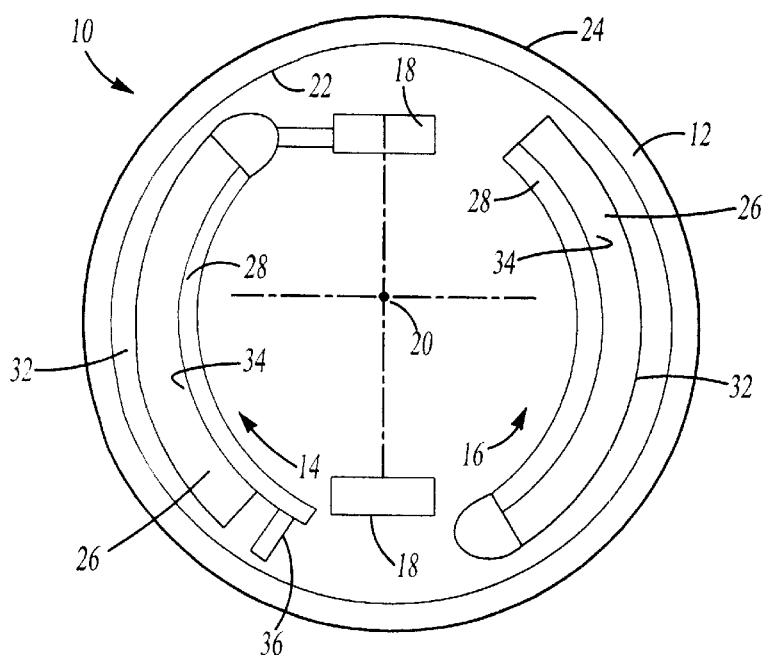
FIG. 1 is a side view of a drum brake system including a brake shoe assembly having a brake lining wear sensor in accordance with the present invention.

Referring to FIG. 1, a brake shoe assembly having a brake lining wear sensor in accordance with the present invention is shown installed in a vehicular brake system. The inventive brake shoe assembly, as described below, may be incorporated into several different types of conventional brake systems including, but not limited to, drum brake systems and disc brake systems. Thus, the brake shoe assembly has been illustrated in a drum brake system in FIG. 1 for descriptive purposes only and not to limit the scope of the present invention.

FIG. 1 is a side view of a drum brake system 10. The drum brake system 10 includes a cylindrical brake drum 12, a first brake shoe assembly generally shown at 14, a second brake shoe assembly generally shown at 16, and an actuator 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-cam brake, a wedge brake, or a drum brake actuated by a hydraulic cylinder. The actuator 18, shown schematically in FIG. 1, represents any known actuating mechanism for drum brake systems such as an scam mechanism, a wedge mechanism, or a hydraulic cylinder. The actuator 18 moves the first and second brake shoe assemblies 14 and 16 into contact with the rotating brake drum 12 and can be controlled hydraulically or pneumatically.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26 having a predetermined thickness. The brake linings 26 are comprised of a known friction material attached to a backing plate 28. Each brake lining 26 presents a wear surface 32 which contacts the inner surface 22 of the rotating brake drum 12 and wears further and further away each time the actuator 18 moves the first and second brake shoe assemblies 14 and 16 against the brake drum 12. After numerous brake applications, the brake linings 26 wear below a critical thickness and, therefore, must be replaced. Each brake lining 26 also includes an interface surface 34 which contacts the backing plate 28.

A brake lining wear sensor 36, shown schematically in FIG. 1, is attached to the backing plate 28 of the first brake shoe assembly 14. The brake lining wear sensor 36 is positioned to wear away as the brake lining 26 gradually wears away during brake applications. In FIG. 1, the brake lining wear sensor 36 is positioned adjacent to the brake lining 26. Alternatively, the brake lining wear sensor 36 may be embedded or encapsulated in the brake lining 26. The brake lining wear sensor 36 can be incorporated in either the first and/or the second brake shoe assemblies 14 and 16, but typically need only be incorporated in the leading brake shoe assembly which experiences the most brake lining wear.

The brake lining wear sensor 36 includes a pair of spaced electrical conductors and an electrical resistance located across the pair of spaced conductors. As the length of the brake lining wear sensor 36 gradually wears away, the electrical resistance across the pair of spaced conductors continuously changes. In this manner, the electrical resistance across the pair of spaced conductors is used to determine the thickness of the brake lining 26. To accomplish this objective, the brake lining wear sensor 36 is comprised of components having wear properties similar to the wear properties of the brake lining 26.

In accordance with the scope of the present invention, the brake lining wear sensor 36 can be assembled in alternative embodiments, wherein like numerals are increased by multiples of 100 to indicate like or corresponding parts.

Figure 2A:
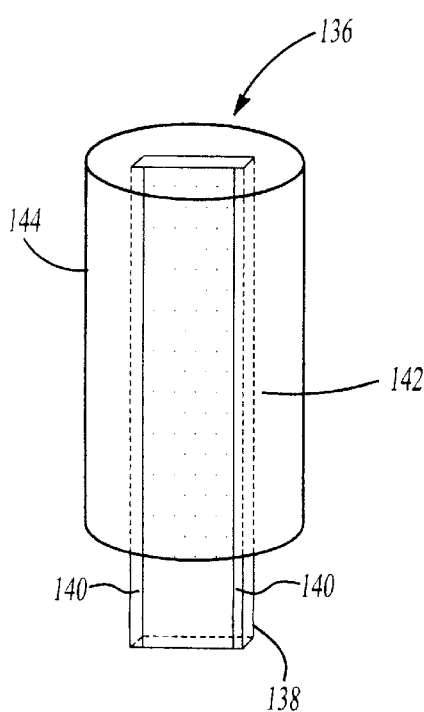
FIGS. 2A and 2B are perspective views of a first embodiment of a brake lining wear sensor in accordance with the present invention.

FIG. 2A is a perspective view of a first embodiment of a brake lining wear sensor 136 in accordance with the present invention. The brake lining wear sensor 136 includes an insulating substrate 138, a pair of spaced electrical conductors 140 cohered to one surface of the substrate 138, and a layer of material 142 cohered to the substrate 138. In this first embodiment, the layer of material 142 provides an electrical resistance across the pair of spaced conductors 140. A body of material 144 supports the substrate 138. As described above, the brake lining wear sensor 136, including the substrate 138, the pair of spaced conductors 140, the strip of film material 142, and the body of material 144, is positioned to wear away concurrently with the brake lining 26, thereby continuously changing the resistance across the pair of spaced conductors 140.

In this first embodiment, the substrate 138 consists of a glass epoxy or a high temperature ceramic. A conductor, such as copper, tin, or tin plated copper, is applied to the substrate 138 and etched to produce the pair of spaced conductors 140. Alternatively, a conductor may be screened or evaporated onto the substrate 138 and etched to produce the pair of spaced conductors 140. The layer of resistance material 142 consists of a carbon powder base, commonly referred to as a CERMET compound, which is silk-screened onto the substrate 138. A phenolic potting compound or high temperature cement is used to form the body 144.

The pair of conductors 140 may be spaced parallel to each other. One of ordinary skill in the art will recognize that the spacing of the pair of conductors 140 determines the rate of change in the resistance across the pair of conductors 140 as the length of the brake lining wear sensor 136 is worn away. Accordingly, the spacing between the conductors 140 may be adapted to achieve a desired rate of change for different applications.

Figure 2B:
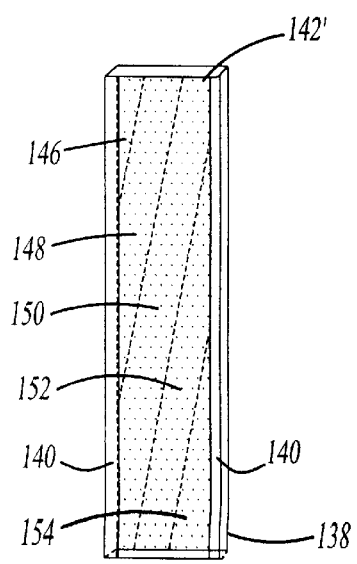

FIG. 2B is a perspective view of the substrate 138 covered with an alternative layer of material 142'. The alternative layer of material 142' includes a plurality of adjacent portions 146, 148, 150, 152, and 154, each having a unique resistance. The adjacent portions 146, 148, 150, 152, and 154 may be arranged to achieve a desired rate of change in the resistance across the pair of spaced conductors 140 as the length of the brake lining wear sensor 136 is worn away. Preferably, the adjacent portions 146, 148, 150, 152, and 154 are positioned diagonal to the pair of spaced conductors 140, as illustrated in FIG. 2B, to provide a linear rate of change in the resistance across the pair of spaced conductors 140 as the length of the brake lining wear sensor 136 is worn away.

Figure 3:
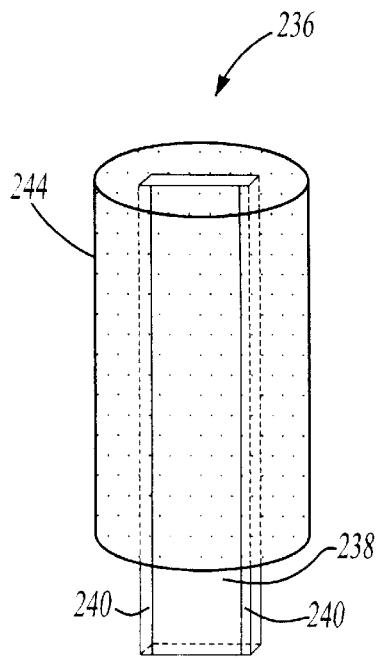
FIG. 3 is a perspective view of a second embodiment of a brake lining wear sensor in accordance with the present invention.

FIG. 3 is a perspective view of a second embodiment of a brake lining wear sensor 236 in accordance with the present invention. The brake lining wear sensor 236 includes an insulating substrate 238, a pair of spaced electrical conductors 240 cohered to one surface of the substrate 238, and a body of material 244 supporting the substrate 238. In this second embodiment, the body of material 244 provides an electrical resistance across the pair of spaced conductors 240. As described above, the brake lining wear sensor 236, including the substrate 238, the pair of spaced conductors 240, and the body of resistive material 244, is positioned to wear away concurrently with the brake lining 26, thereby continuously changing the resistance across the pair of spaced conductors 240.

In this second embodiment, the substrate 238 consists of a glass epoxy or a high temperature ceramic. A conductor, such as copper, tin, or tin plated copper, is applied to the substrate 238 and etched to produce the pair of spaced conductors 240. Alternatively, a conductor may be screened or evaporated onto the substrate 238 and etched to produce the pair of spaced conductors 240. A compound consisting of approximately thirty percent carbon fiber and seventy percent phenolic resin is used to form the resistive body 244. Kevlar fibers may be added as an emulsifier. Alternatively, a resistive potting compound, typically a mixture of carbon and an encapsulant such as epoxy, may be used to form the resistive body 244.

Figure 4:
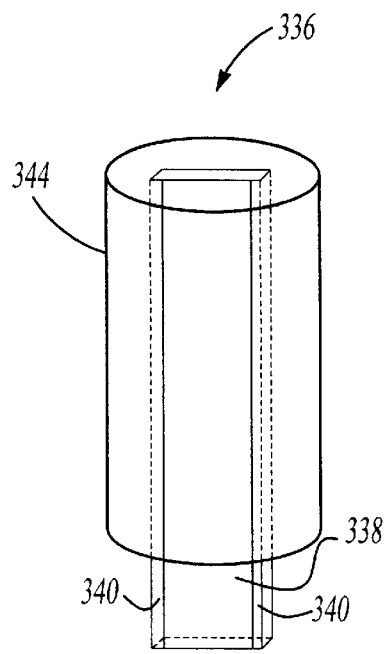
FIG. 4 is a perspective view of a third embodiment of a brake lining wear sensor in accordance with the present invention.

FIG. 4 is a perspective view of a third embodiment of a brake lining wear sensor 336 in accordance with the present invention. The brake lining wear sensor 336 includes a substrate 338 and a pair of spaced electrical conductors 340 cohered to one surface of the substrate 338. In this third embodiment, a resistive compound is mixed in the substrate 338 to provide an electrical resistance across the pair of spaced conductors 340. A body of material 344 supports the substrate 338. As described above, the brake lining wear sensor 336, including the substrate 338, the pair of spaced conductors 340, and the body of material 344, is positioned to wear away concurrently with the brake lining 26, thereby continuously changing the resistance across the pair of spaced conductors 240.

In this third embodiment, the substrate 338 consists of a glass epoxy or a high temperature ceramic mixed with a resistive carbon compound. Copper is laminated to the substrate 338 and etched to produce the pair of spaced conductors 340. A phenolic potting compound is used to form the body 344.

Figure 5:
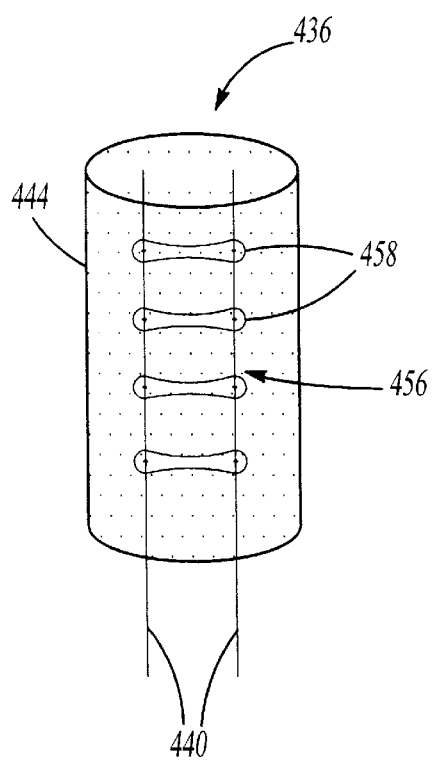
FIG. 5 is a perspective view of a fourth embodiment of a brake lining wear sensor in accordance with the present invention.

FIG. 5 is a perspective view of a fourth embodiment of a brake lining wear sensor 436 in accordance with the present invention. The brake lining wear sensor 436 includes a frame 456 and a body of material 444 supporting the frame 456. The frame 456 includes a pair of spaced electrical conductors 440 and a plurality of support pieces 458 attached between the pair of spaced conductors 440. In this fourth embodiment, the body of material 444 provides an electrical resistance across the pair of spaced conductors 440. As described above, the brake lining wear sensor 436, including the frame 456, the pair of spaced conductors 440, the plurality of support pieces 458, and the body of resistive material 444, is positioned to wear away concurrently with the brake lining 26, thereby continuously changing the resistance across the pair of spaced conductors 240.

In this fourth embodiment, the frame 456 is made from copper wire. Preferably, the surface of the frame 456 is abraded to form a strong electromechanical bond with the body of resistive material 444. A compound consisting of approximately thirty percent carbon fiber and seventy percent phenolic resin is used to form the resistive body 444. Kevlar fibers may be added as an emulsifier. Alternatively, a resistive potting compound, typically a mixture of carbon and an encapsulant such as epoxy, may be used to form the resistive body 444.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A brake shoe assembly for a vehicle comprising:
   a brake lining having a predetermined thickness for gradually wearing away as the brake shoe assembly brakes the vehicle; and
   a sensor having a pair of spaced electrical conductors and an electrical resistance for indicating said thickness of said brake lining located across said pair of spaced conductors, said pair of spaced conductors being cohered to a subtrate;
   said sensor positioned to wear away concurrently with said brake lining thereby continuously changing said electrical resistance to an infinite number of values across said pair of spaced conductors.

2. An assembly as set forth in claim 1 wherein said pair of conductors are spaced parallel to each other.

3. An assembly as set forth in claim 1 wherein said sensor includes a layer of material cohered to said substrate and providing said electrical resistance across said pair of spaced conductors.

4. An assembly as set forth in claim 1 wherein said sensor includes a body of material supporting said substrate.

5. An assembly as set forth in claim 1 wherein said sensor includes a body of material supporting said substrate, said body of material providing said electrical resistance across said pair of spaced conductors.

6. An assembly as set forth in claim 1 wherein said sensor includes a resistive compound mixed in said substrate providing said electrical resistance across said pair of spaced conductors.

7. An assembly as set forth in claim 6 including a body of material supporting said substrate.

8. A brake shoe assembly for a vehicle comprising:
   a brake lining having a predetermined thickness for gradually wearing away as the brake shoe assembly brakes the vehicle; and
   a sensor having a pair of spaced electrical conductors and an electrical resistance for indicating the thickness of said brake lining located across said pair of spaced conductors, said sensor including a substrate with said pair of spaced conductors being cohered to said substrate and including a layer of material cohered to said substrate and providing said electrical resistance across said pair of spaced conductors;
   wherein said layer of material includes a plurality of adjacent portions each having a unique resistance arranged to provide a linear change in said electrical resistance across said pair of spaced conductors as said sensor wears away;
   said sensor positioned to wear away concurrently with said brake lining thereby continuously changing said electrical resistance across said pair of spaced conductors.

9. An assembly as set forth in claim 1 wherein said plurality of adjacent portions are positioned diagonal to said pair of spaced conductors.

10. A brake shoe assembly for a vehicle comprising:
    a brake lining having a predetermined thickness for gradually wearing away as the brake shoe assembly brakes the vehicle; and
    a sensor having a pair of electrical conductors spaced parallel to each other and having an electrical resistance for indicating the thickness of said brake lining located across said pair of spaced conductors;
    wherein said sensor includes a plurality of support pieces attached between said pair of spaced conductors to form a frame;
    said sensor positioned to wear away concurrently with said brake lining thereby continuously changing said electrical resistance across said pair of spaced conductors.

11. An assembly as set forth in claim 10 wherein said sensor includes a body of material supporting said frame, said body of material providing said electrical resistance across said pair of spaced conductors.

12. A sensor for detecting wear of a brake lining comprising:
    a pair of spaced electrical conductors; and
    an electrical resistance located across said pair of spaced conductors;
    said pair of spaced conductors, being cohered to a substrate and said electrical resistance positioned to wear away concurrently with said brake lining thereby continuously changing said electrical resistance to an infinite number of values across said pair of spaced conductors.

13. A sensor as set forth in claim 12 including a layer of material cohered to said substrate and providing said electrical resistance across said pair of spaced conductors.

14. A sensor as set forth in claim 12 including a body of material supporting said substrate, said body of material providing said electrical resistance across said pair of spaced conductors.

15. A sensor as set forth in claim 12 including a resistive compound mixed in said substrate providing said electrical resistance across said pair of spaced conductors.

16. A sensor for detecting wear of a brake lining comprising:
    a pair of spaced electrical conductors;
    an electrical resistance located across said pair of spaced conductors;
    a substrate wherein said pair of spaced electrical conductors are cohered to said substrate; and
    a layer of material cohered to said substrate and providing said electrical resistance across said pair of spaced conductors;
    said pair of spaced conductors and said electrical resistance positioned to wear away concurrently with the brake lining thereby continuously changing said electrical resistance across said pair of spaced conductors wherein said layer of material includes a plurality of adjacent portions each having a unique resistance arranged to provide a linear change in said electrical resistance across said pair of spaced conductors as said substrate, said pair of spaced conductors, and said strip of resistive material wear away.

17. A sensor for detecting wear of a brake lining comprising:

a pair of spaced electrical conductors;

an electrical resistance located across said pair of spaced conductors; and a plurality of support pieces attached between said pair of spaced conductors to form a frame;

said pair of spaced conductors, and said electrical resistance positioned to wear away concurrently with the brake lining thereby continuously changing said electrical resistance across said pair of spaced conductors.

18. A sensor as set forth in claim 17 including a body of material supporting said frame, said body of material providing said electrical resistance across said pair of spaced conductors.

* * * * *